W. M. SHEPPARD.
MOLD.
APPLICATION FILED OCT. 12, 1909.

953,926.

Patented Apr. 5, 1910.
4 SHEETS—SHEET 1.

Witnesses

Inventor
William Middleton Sheppard,
By Joshua R. H. Potts,
Attorney

W. M. SHEPPARD.
MOLD.
APPLICATION FILED OCT. 12, 1909.
953,926.
Patented Apr. 5, 1910.
4 SHEETS—SHEET 2.
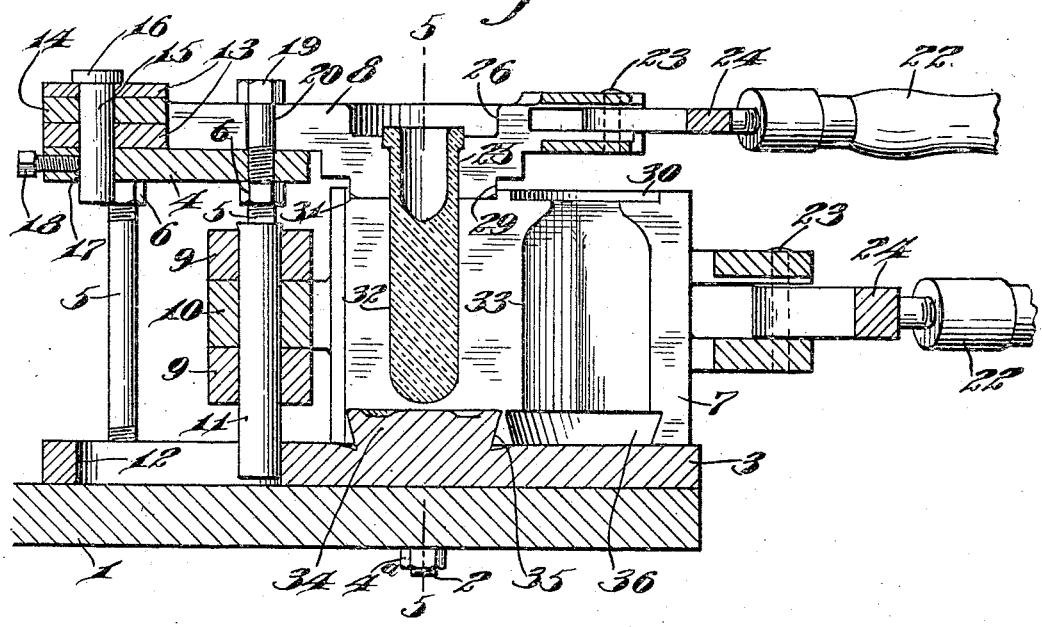
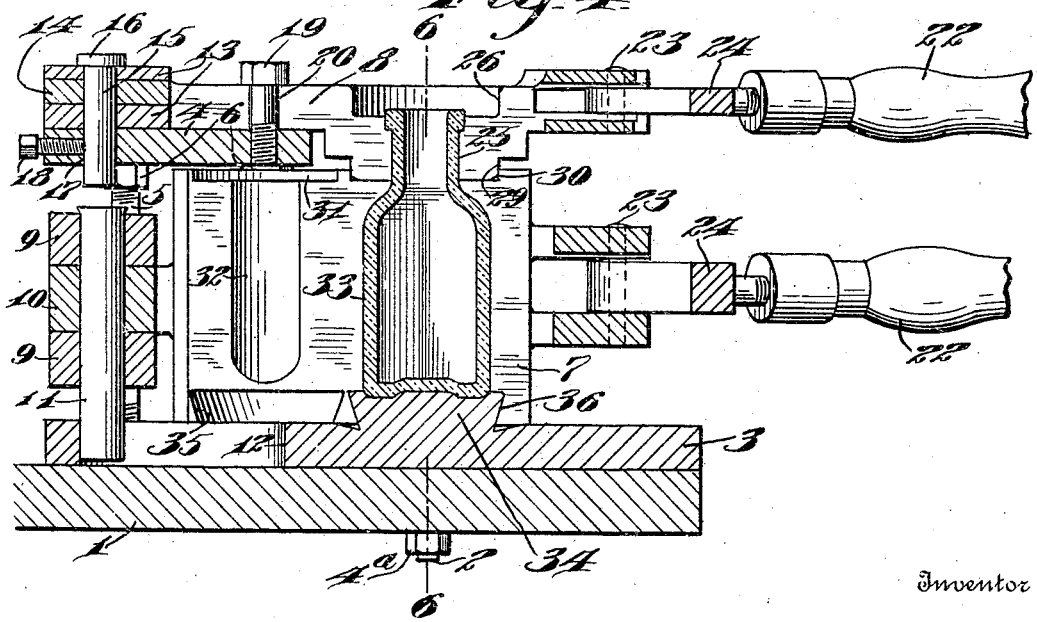
Witnesses
Inventor
William Middleton Sheppard,
By Joshua R. H. Potts,
Attorney W. M. SHEPPARD.
MOLD.
APPLICATION FILED OCT. 12, 1909.
953,926.
Patented Apr. 5, 1910.
4 SHEETS—SHEET 3.
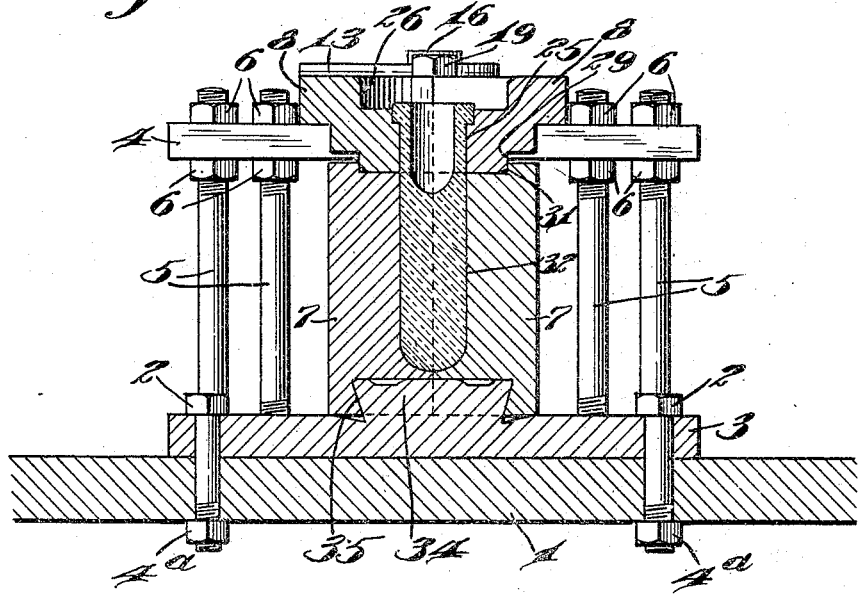
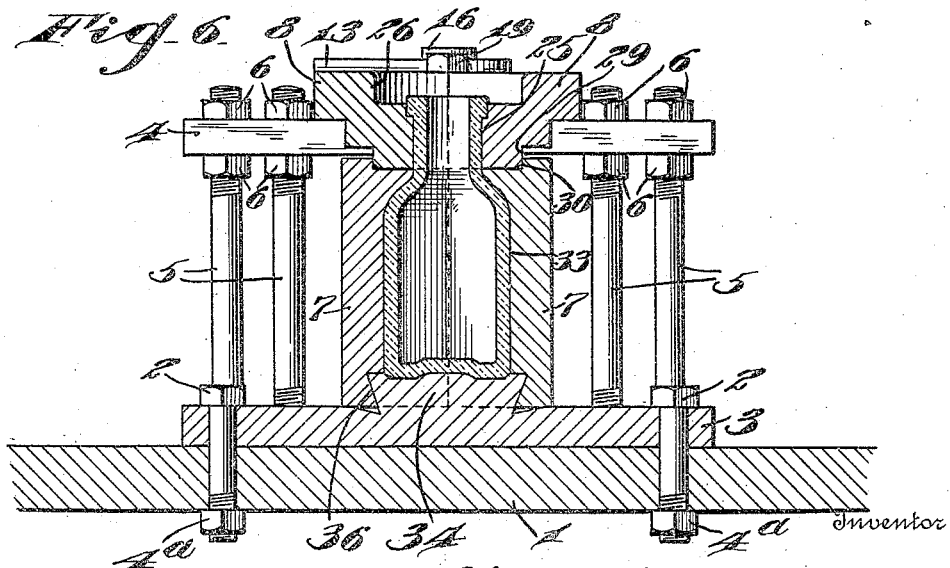
Witnesses
Theo. Reimann
R. S. Krenkel
Inventor
William Middleton Sheppard,
By Joshua R. H. Potts,
Attorney W. M. SHEPPARD.
MOLD.
APPLICATION FILED OCT. 12, 1909.
953,926.
Patented Apr. 5, 1910.
4 SHEETS—SHEET 4.
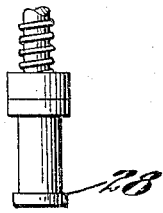
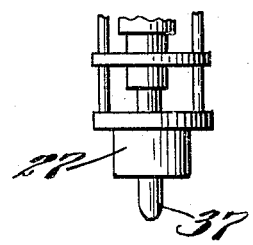
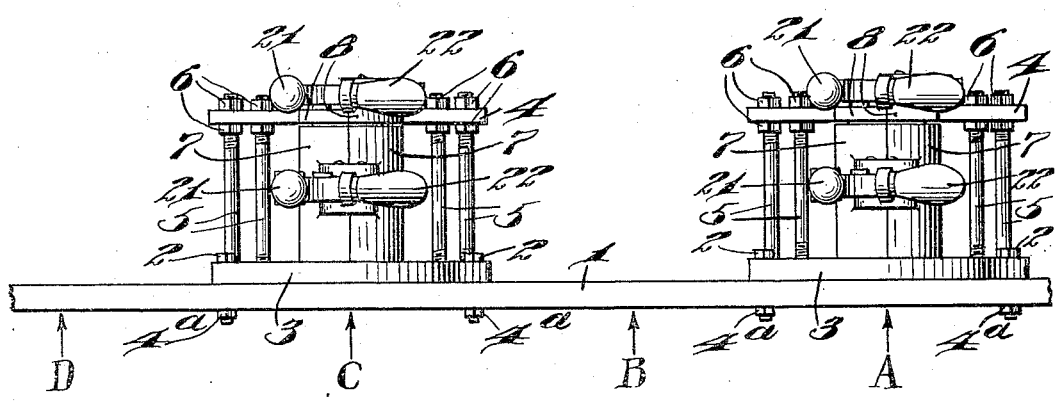
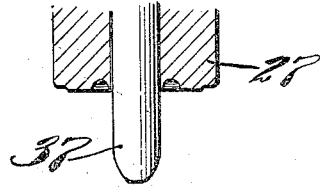
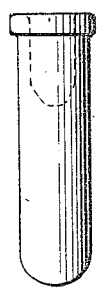
Witnesses
Inventor
William Middleton Sheppard,
By Joshua R. H. Potts,
Attorney

UNITED STATES PATENT OFFICE.

WILLIAM MIDDLETON SHEPPARD, OF BRIDGETON, NEW JERSEY, ASSIGNOR TO PARKER BROTHERS GLASS MANUFACTURING COMPANY, OF BRIDGETON, NEW JERSEY.

MOLD.

953,926.   Specification of Letters Patent.   Patented Apr. 5, 1910.

Application filed October 12, 1909.  Serial No. 522,214.

*To all whom it may concern:*

Be it known that I, WILLIAM MIDDLETON SHEPPARD, a citizen of the United States, residing at Bridgeton, in the county of Cumberland and State of New Jersey, have invented certain new and useful Improvements in Molds, of which the following is a specification.

My invention relates to improvements in molds, more particularly designed for molding articles of glass, an object of the invention being to provide a mold of this character which is designed both as a blank mold and a mold for the finished article, and which is capable of manual operation to permit the mold to be moved so as to position the blank, in the mold for the finished article, in position to be blown.

A further object is to provide a bottle mold comprising an upper neck mold and a lower body mold, the latter having two molding chambers, one for the blank, and the other for the finished bottle, and said lower mold so made as to be manually moved to position either the blank mold, or the bottle mold, in register with the neck mold.

A further object is to provide an improved mold with an improved mounting therefor, which permits the movement of the molds, guides such movement, and limits such movement, so as to properly position the molds in relation to each other, to perfectly form a bottle.

With these and other objects in view the invention consists in certain novel features of construction and combinations and arrangements of parts as will be more fully hereinafter described and pointed out in the claims.

Figure 1:
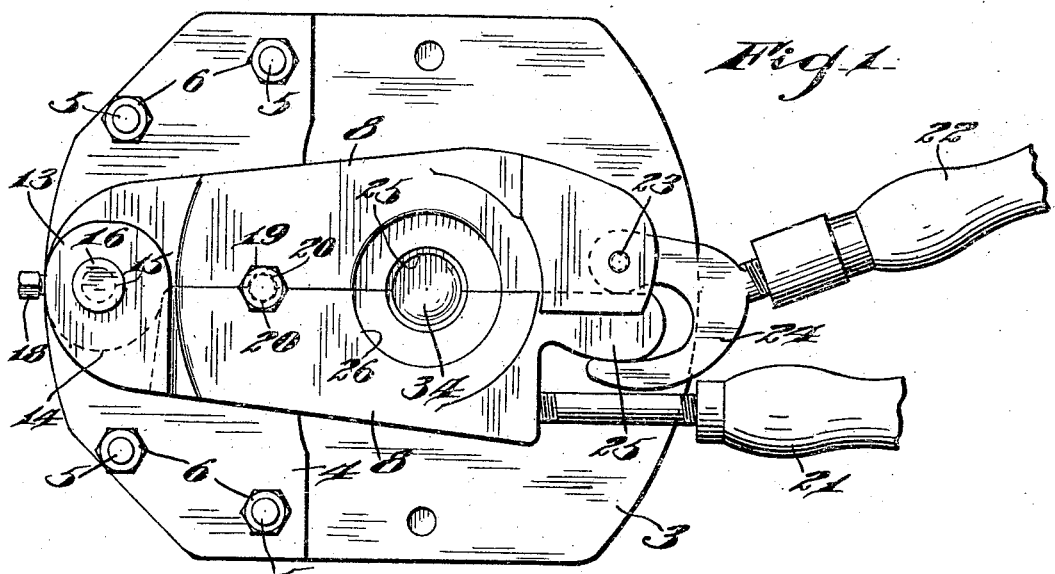
Figure 2:
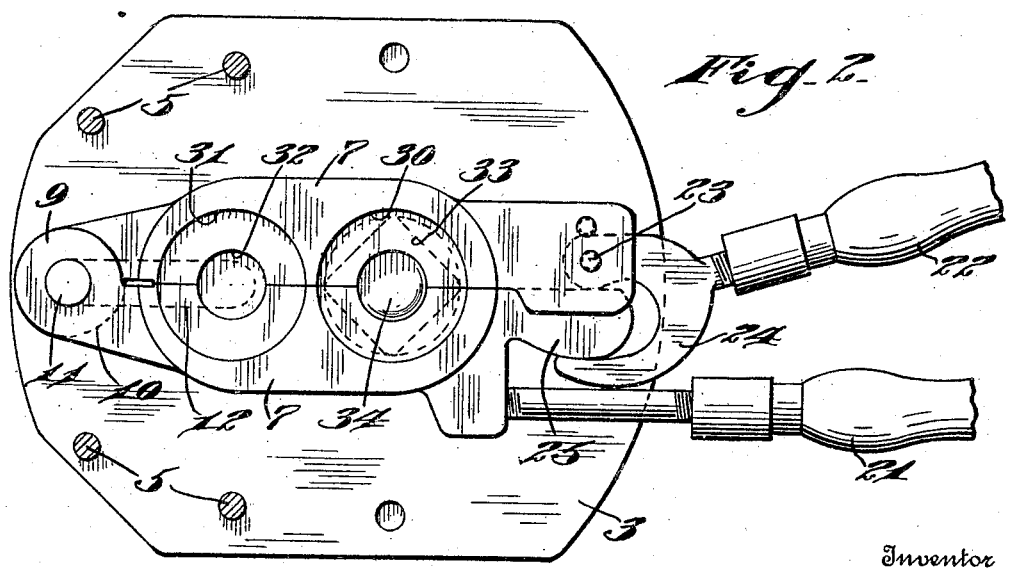

In the accompanying drawings; Figure 1, is a top plan view illustrating my improvements. Fig. 2, is a plan view of the lower blank and body forming mold. Fig. 3, is a view in longitudinal section, showing the parts in position for forming the blank. Fig. 4, is a view in longitudinal section showing the parts in position to form the finished bottle. Fig. 5, is a view in cross section on the line 5—5 of Fig. 3. Fig. 6, is a view in cross section on the line 6—6 of Fig. 4. Fig. 7, is a fragmentary and diagrammatic view illustrating the application of my improvements. Fig. 8, is an enlarged fragmentary view in vertical section of the neck forming plunger. Fig. 9, is a view in elevation of the blank, and Fig. 10, is a view in elevation of the finished bottle.

1, represents a supporting table or platform, which is preferably of the well known rotary type, upon which a circular series of my improved molds are secured by means of bolts 2, as many of such molds being provided as may be desired. Each mold comprises a base plate 3 which is secured, by the bolts 2 and nuts 4ª thereon, to table or platform 1. Secured to, supported above, and parallel with, the bed plate 3, at the rear thereof, is a platform 4, which latter is perforated to receive a series of bolts 5. These bolts 5 have screw threaded lower ends, screwed into threaded openings in base 3, and screw threaded at their upper ends, to receive nuts 6, the latter positioned above and below platform 4, to rigidly secure the platform, and support it at the proper elevation above base 3.

7, 7 represents the two members, or half sections, of my improved body mold, and 8, 8 the two members, or half sections, of my improved neck mold. One member 7 is provided, at its inner end, with a pair of perforated lugs or ears 9, and the other member 7, is provided with a single perforated lug or ear 10, which is positioned between lugs 9 and has is opening in alinement with the openings in the lugs or ears 9, to receive a hinge pin 11. The pin 11 is preferably slightly enlarged at its upper end to limit its vertical movement, and the lower end of said pin 11, projects into a longitudinal slot 12 in base 3. This slot 12 therefore serves to limit the movement of the body mold, in its forward and rearward movements.

One neck mold member 8, is provided with a pair of perforated lugs or ears 13, at its rear end, and the other member 8, is provided with a single perforated lug or ear 14, the openings in said lugs or ears 13 and 14 being in register, to receive a hinge-pin 15. This hinge-pin 15 is provided with a head 16 at its upper end, and is adapted to be positioned in an opening 17 on platform 4, and is secured by a set screw 18 in said platform, to securely lock the pin against movement.

A bolt 19 is secured in platform 4 and is located in the forward central portion of the platform, and is adapted to limit the pivotal movement of the members 8 in one direction, said members having recesses 20 to receive the bolt 19 when the members are together. In other words this bolt 19 serves to properly center the members of the neck mold when moved to a closed position.

To one member of the neck mold 8, and to the corresponding member of the body mold below, handles 21 are rigidly secured, while to the other members of the neck and body mold, handles 22 are pivotally connected, the said handles 22 being pivoted upon pins 23, and located within bifurcated portions of the mold members. These hinged handles 22 are provided with curved lugs 24, adapted to engage eccentric or cam enlargements 25 on the other member of the mold, to tightly clamp the mold members in closed position.

The neck receiving mold members 8, 8 when together, constitute a neck forming opening 25 and a circular recess 26, in its upper face, to receive the neck shaping plunger 27, and the blast plunger 28 as will more fully hereinafter appear.

The lower face of the neck forming mold is provided with a circular enlargement 29, over which the circular recessed upper portions 30 and 31 of the body mold below, are adapted to be positioned so as to properly center the body mold with relation to the neck mold above.

While I term the lower mold 7, "body mold," it is as a matter of fact a blank mold and a body mold combined. That is to say, in the adjacent faces of the member 7, 7, recesses are provided, which when together form a blank mold 32, and a body mold 33, the blank mold being located nearer the rear or hinged end of the mold, but of course I am not limited in this particular. The blank mold is complete of itself in the mold members 7, 7 while the body mold is without a bottom, said bottom being formed integrally with base 3 and constituting a circular enlargement 34, having beveled dovetailed edges, as clearly shown, and both members 7, 7 are provided with recesses 35 and 36, to accommodate this enlargement 34. The recesses 36 being below and in communication with the body mold 33, while the recesses 35, are entirely below, and do not communicate with the blank mold 32.

As stated above, a plurality of these double molds, are placed in a circular series and an equal distance apart upon a rotary platform 1. Above this platform, as is the case with a great many similar apparatuses in use, the blank forming plunger 27, and the air blast plunger 28, are provided, and are adapted to be operated by any suitable power. These plungers 27 and 28, are located a distance apart exactly equal to the distance apart the molds are placed, and these plungers will be simultaneously lowered, whereby when the blank is being formed in one mold, the bottle is being blown in the mold in advance thereof. The plunger 27, in its lower face, is shaped to conform to the upper end of the bottle neck, so that when it is lowered into the circular recesses 26 and the plunger rod 37 forced into the glass to form the air entrance recess in the blank, the upper or neck end of the bottle will be pressed.

By reference to Fig. 1, the letter A indicates the point at which the main operator stands. The points B and D are points at which boys are stationed, and the point C is the point of blowing. At the point A, the mold is in the position shown in Figs. 3 and 5. A quantity of molten glass is directed into the mold through the neck forming upper mold members 8 and the operator at A, then compels plunger 27 with the rod 37 therein to descend, at the same time, causing the blast plunger 28 to descend. When the plunger 27 is forced down into the neck mold, and the rod 37 into the blank, the neck of the bottle is formed in the neck mold and the recess is formed in the blank to receive air for blowing. The operator then turns the table 1, a distance equal from A to B where as above stated, a boy is positioned who opens the body mold, and pushes the members rearwardly, and closes them, with the blank, positioned in the body mold 33. The table is then moved a distance equal to the distance between B and C, where, as the operator at A, cuts off the glass and operates plungers 27 as above explained, he at the same time causes the air plunger 28 to descend, and the blast through said plunger, blows the bottle into the shape shown most clearly in Figs. 4, 6, and 10. The table is then moved a distance equal to the distance between C and D, at which latter point a boy is stationed, who opens the mold members takes out the bottle, and closes the mold members, leaving them in the position shown in Figs. 3 and 5, so that when the mold again reaches the point A it will be in position to receive the molten glass. It will therefore be noted that with my improved mold, it is simply necessary, after the blank is formed, to open mold members 7 and push the members 7 inwardly or rearwardly, such movement being limited by the pin 11 in slot 12, and then close said mold members 7 over the dovetailed enlargement 34, the latter serving to guide the mold members properly together, and also forms the bottom of the mold.

A great many slight changes might be made in the general form and arrangement of parts described, without departing from my invention, and hence I do not restrict myself to the precise details set forth, but consider myself at liberty to make such changes and alterations as fairly fall within spirit and scope of the appended claims.

Having thus described my invention, what I claim as new and desire to secure by Letters Patent is:—

1. A device of the character described, comprising a base plate, a platform, bolts secured in the base supporting the platform elevated above the base, a neck mold pivotally supported upon said platform and a body mold pivotally supported upon said base and below said platform.

2. A device of the character described, comprising a base plate and platform above and secured to said base plate, a neck mold pivotally supported on said platform and consisting of two half sections or members hinged together, a body mold supported on said base plate below the platform, and consisting of two members hinged together, a slot in said base plate, a hinge-pin connecting the members of the body mold and projecting into said slot, said body mold having two pairs of registering recesses, one pair to form a blank mold and the other pair to form an article mold, said pin and slot limiting the movements of the body mold to position either of said pairs of recesses in register with the neck mold.

3. A device of the character described, comprising a base plate, a body mold on said plate comprising two members hinged together, an enlargement on said base plate, recesses in said body mold to receive said enlargement which latter constitutes the bottom of the body mold, a platform rigidly secured to the base plate and located above the body mold and a neck mold above said body mold, and pivotally secured on said platform.

4. A device of the character described, comprising a base plate, a platform, bolts secured in the base supporting the platform elevated above the base, a neck mold pivotally supported upon said platform a body mold pivotally supported upon said base and below said platform, and means on said molds compelling the neck mold and the molding recesses in the body mold members, to register when together.

5. A device of the character described, comprising a base plate and platform above and secured to said base plate, a neck mold pivotally supported on said platform and consisting of two half sections or members hinged together, a body mold supported on said base plate below the platform, and consisting of two members hinged together, a slot in said base plate, a hinge-pin connecting the members of the body mold and projecting into said slot, said body mold having two pairs of registering recesses, one pair to form a blank mold and the other pair to form an article mold, said pin and slot limiting the movements of the body mold to position either of said pairs of recesses in register with the neck mold, and means on said molds compelling the neck mold and the molding recesses in the body mold members, to register when together.

6. A device of the character described, comprising a base plate, a body mold on said plate comprising two members hinged together, an enlargement on said base plate, recesses in said body mold to receive said enlargement which latter constitutes the bottom of the body mold, a platform rigidly secured to the base plate and located above the body mold a neck mold above said body mold pivotally secured to said platform, and means on said molds compelling the neck mold and the molding recesses in the body mold members, to register when together.

In testimony whereof I have signed my name to this specification in the presence of two subscribing witnesses.

WILLIAM MIDDLETON SHEPPARD.

Witnesses:
HOWARD L. WESTCOTT,
JOSEPH H. POWELL.